United States Patent [19]
Chen

[11] Patent Number: 5,924,357
[45] Date of Patent: Jul. 20, 1999

[54] COVER FOR FRUIT AND VEGETABLE JUICE EXTRACTOR

[76] Inventor: Ming-Sung Chen, No. 9, Lane 471, Chug-Shan S. Rd., Yung-Kang City, Tainan Hsien, Taiwan

[21] Appl. No.: 09/232,780

[22] Filed: Jan. 19, 1999

[51] Int. Cl.⁶ .............................. A23N 1/00; A23N 1/02; A47J 19/02; A47J 43/04
[52] U.S. Cl. ................................ 99/511; 99/495; 99/513; 210/360.1; 210/380.1; 241/92; 241/282.1; 494/60; 494/84
[58] Field of Search ............................. 99/484, 489, 492, 99/495, 509–513; 210/360.1, 380.1, 369; 241/36, 37.5, 92, 282.1; 366/246, 331, 347, 314, 601; 494/56, 58, 60, 43, 84, 36

[56] References Cited

U.S. PATENT DOCUMENTS

| | | | |
|---|---|---|---|
| 2,590,237 | 3/1952 | Doering | 99/511 |
| 4,345,517 | 8/1982 | Arao et al. | 99/513 X |
| 4,506,601 | 3/1985 | Ramirez et al. | 99/511 |
| 4,614,153 | 9/1986 | Kurome et al. | 99/513 X |
| 4,700,621 | 10/1987 | Elger | 99/511 |
| 5,222,430 | 6/1993 | Wang | 241/282.1 |
| 5,257,575 | 11/1993 | Harrison et al. | 99/511 |
| 5,355,784 | 10/1994 | Franklin et al. | 366/601 X |
| 5,392,699 | 2/1995 | Tai | 241/92 X |
| 5,421,248 | 6/1995 | Hsu | 99/512 |
| 5,495,795 | 3/1996 | Harrison et al. | 99/492 |
| 5,819,641 | 10/1998 | Hsu | 99/492 |

*Primary Examiner*—Timothy F. Simone
*Attorney, Agent, or Firm*—William E. Pelton, Esq.

[57] ABSTRACT

A fruit and vegetable juice extractor includes a motor base, a rotary disk rotatably mounted on the top of the motor base, a housing secured on the top of the motor base and containing a socket defined in the bottom thereof for receiving the rotary disk therein, a funnel-shaped strainer hood rotatably mounted in the housing and having a bottom wall secured to the rotary disk to rotate therewith, and a tapered wall containing a plurality of meshes formed therein, and a cutter disk rotatably mounted in the housing and secured to the bottom wall of the strainer hood to rotate therewith. A cover is mounted to the top of the housing and includes a feed tube having a first end portion extending outward from the cover, and a second end portion extending inward from the cover and located adjacent to the cutter disk, and a baffle device formed in the cover and located adjacent to the cutter disk.

10 Claims, 9 Drawing Sheets

COVER FOR FRUIT AND VEGETABLE JUICE EXTRACTOR

CROSS-REFERENCES TO RELATED APPLICATIONS

Not Applicable.

BACKGROUND OF THE INVENTION

1. Field of the Invention

The present invention relates to a cover, and more particularly to a cover (or lid) for a fruit and vegetable juice extractor.

2. Description of the Related Art

A conventional fruit and vegetable juice extractor (50) in accordance with the prior art shown in FIG. 9 comprises a motor base (51), a rotary disk (514) rotatably mounted on the motor base (51), a motor (not shown) mounted in the motor base (51) for rotating the rotary disk (514), a block (510) secured on the rotary disk (514) to rotate therewith, a threaded rod (511) secured on the block (510) to rotate therewith, a housing (52) secured on the motor base (51) for receiving the rotary disk (514) therein, a juice spout (522) mounted on the periphery of the housing (52), a juice collector cup (58) attached to the motor base (51) and located under the juice spout (522), a cap (53) received in the housing (52) and secured on the rotary disk (514) to rotate therewith, a strainer hood (54) rotatably mounted in the housing (52) and including a bottom wall (540) secured to the block (510) to rotate therewith, and a tapered wall formed with a plurality of meshes (542), a cutter disk (55) rotatably mounted in the housing (52) and including a shaft (551) secured to the threaded rod (511) to rotate therewith, and a plurality of cutter blades (552) arranged in a radiating manner, a dregs receiving container (57) attached to a platform (515) of the motor base (51) and connecting to the strainer hood (54), and a cover (56) mounted to the top of the housing (52) and including a feed tube (560) having a first end portion extending outward from the cover (56), and a second end portion extending inward from the cover (56) and located adjacent to the cutter blades (552) of the cutter disk (55). The central shaft (551) is screwed on the threaded rod (511), thereby securing the cutter disk (55) to the threaded rod (511). In such a manner, the cutter disk (55), the strainer hood (54) and the cap (53) are simultaneously rotated when the rotary disk (514) is rotated.

In operation, the fruits and vegetables pushed into the feed tube (560) are cut into pieces by means of the cutter blades (552) of the rotating cutter disk (55), thereby extracting juices from the fruits and vegetables, which are then poured into the juice collector cup (58) through the juice spout (522). The residual dregs being left after the extracting process are then carried into the dregs receiving container (57) through the tapered wall of the strainer hood (54) by means of the centrifugal force exerted by the cutter blades (552) of the cutter disk (55) rotating at a high speed.

In such a manner, however, the residual dregs of the fruits and vegetables move in a large space defined between the wall of the cover (56) and the cutter disk (55) such that the residual dregs are easily thrown into the dregs receiving container (57), thereby shortening the contact time of the residual dregs with the cutter blades (552) of the cutter disk (55) such that the juice extracting and straining effect of fruit and vegetable juice extractor (50) to the fruits and vegetables is not efficient.

The present invention has arisen to mitigate and/or obviate the disadvantage of the conventional fruit and vegetable juice extractor.

BRIEF SUMMARY OF THE INVENTION

In accordance with one aspect of the present invention, there is provided a cover in combination with a fruit and vegetable juice extractor, the fruit and vegetable juice extractor comprising: a motor base, a rotary disk rotatably mounted on the top of the motor base, a housing secured on the top of the motor base and containing a socket defined in the bottom thereof for receiving the rotary disk therein, a funnel-shaped strainer hood rotatably mounted in the housing and including a bottom wall secured to the rotary disk to rotate therewith, and a tapered wall containing a plurality of meshes formed therein, and a cutter disk rotatably mounted in the housing and secured to the bottom wall of the strainer hood to rotate therewith, and the cover mounted to the top of the housing and comprising: a feed tube formed in the cover and having a first end portion extending outward from the cover, and a second end portion extending inward from the cover and located adjacent to the cutter disk; and a baffle device formed in the cover and located adjacent to the cutter disk.

Further benefits and advantages of the present invention will become apparent after a careful reading of the detailed description with appropriate reference to the accompanying drawings.

DETAILED DESCRIPTION OF THE INVENTION

Figure 1:
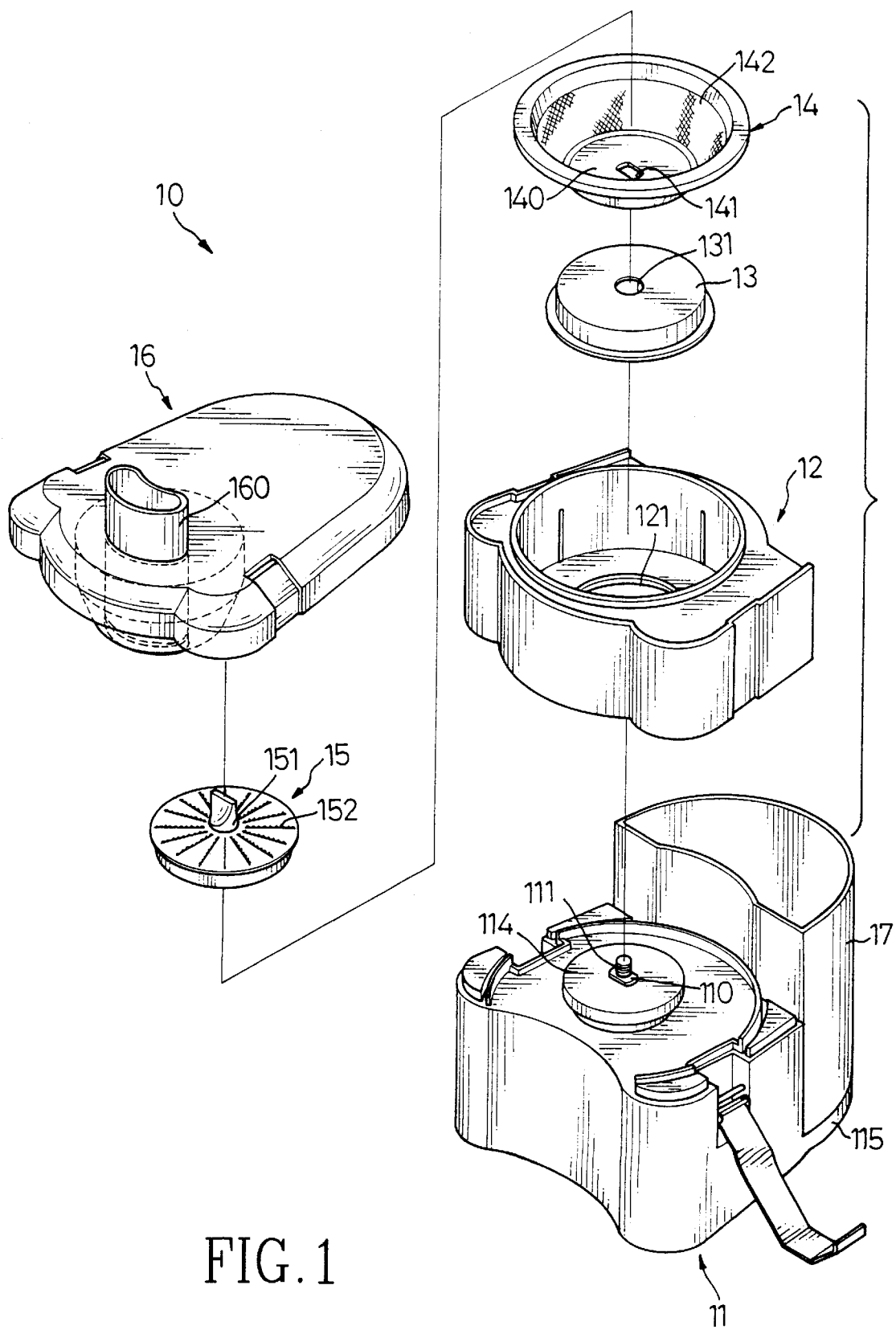
FIG. 1 is an exploded perspective view of a fruit and vegetable juice extractor in accordance with a first embodiment of the present invention.
Figure 2:
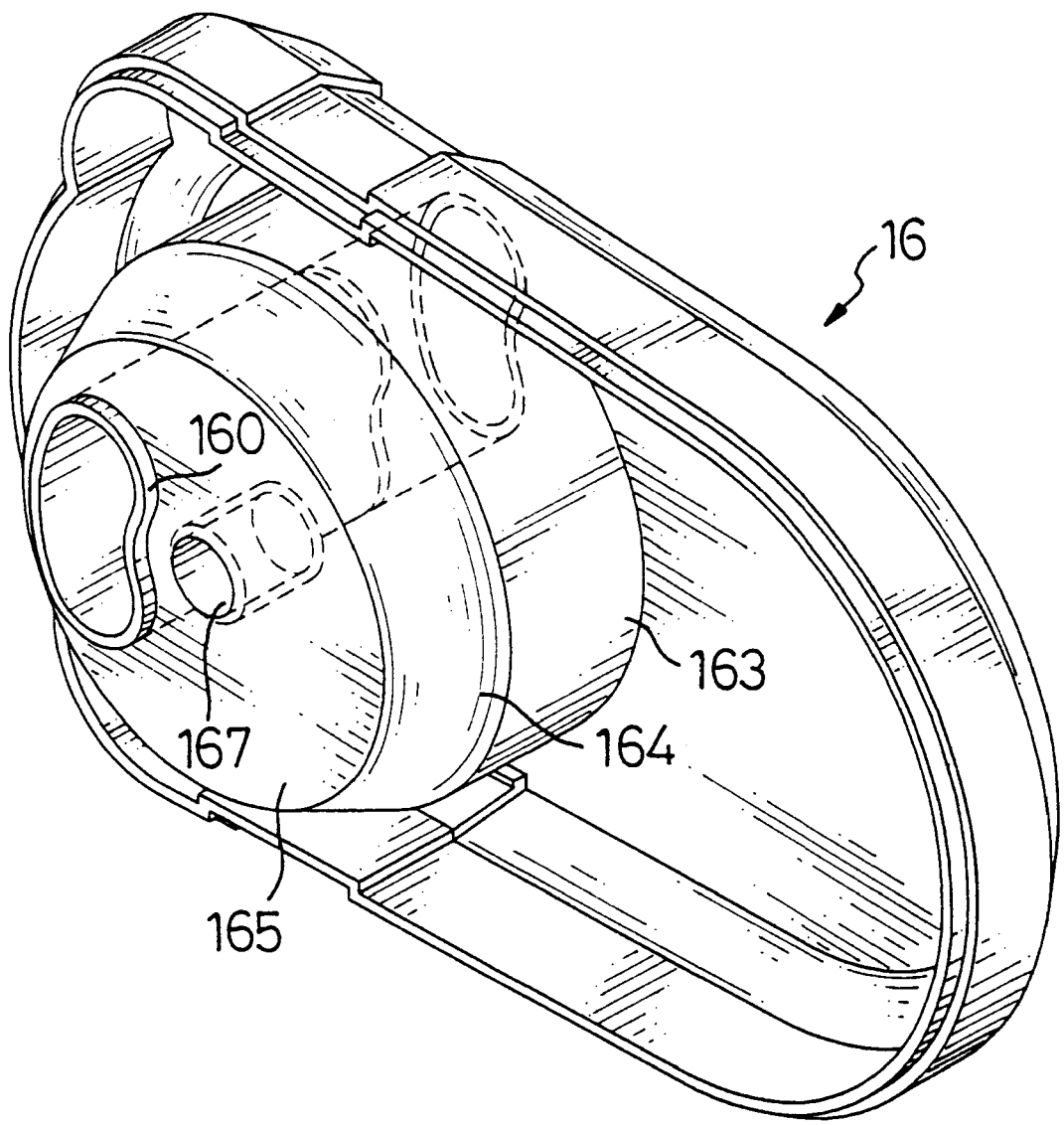
FIG. 2 is a perspective view of a cover for the fruit and vegetable juice extractor as shown in FIG. 1.
Figure 3:
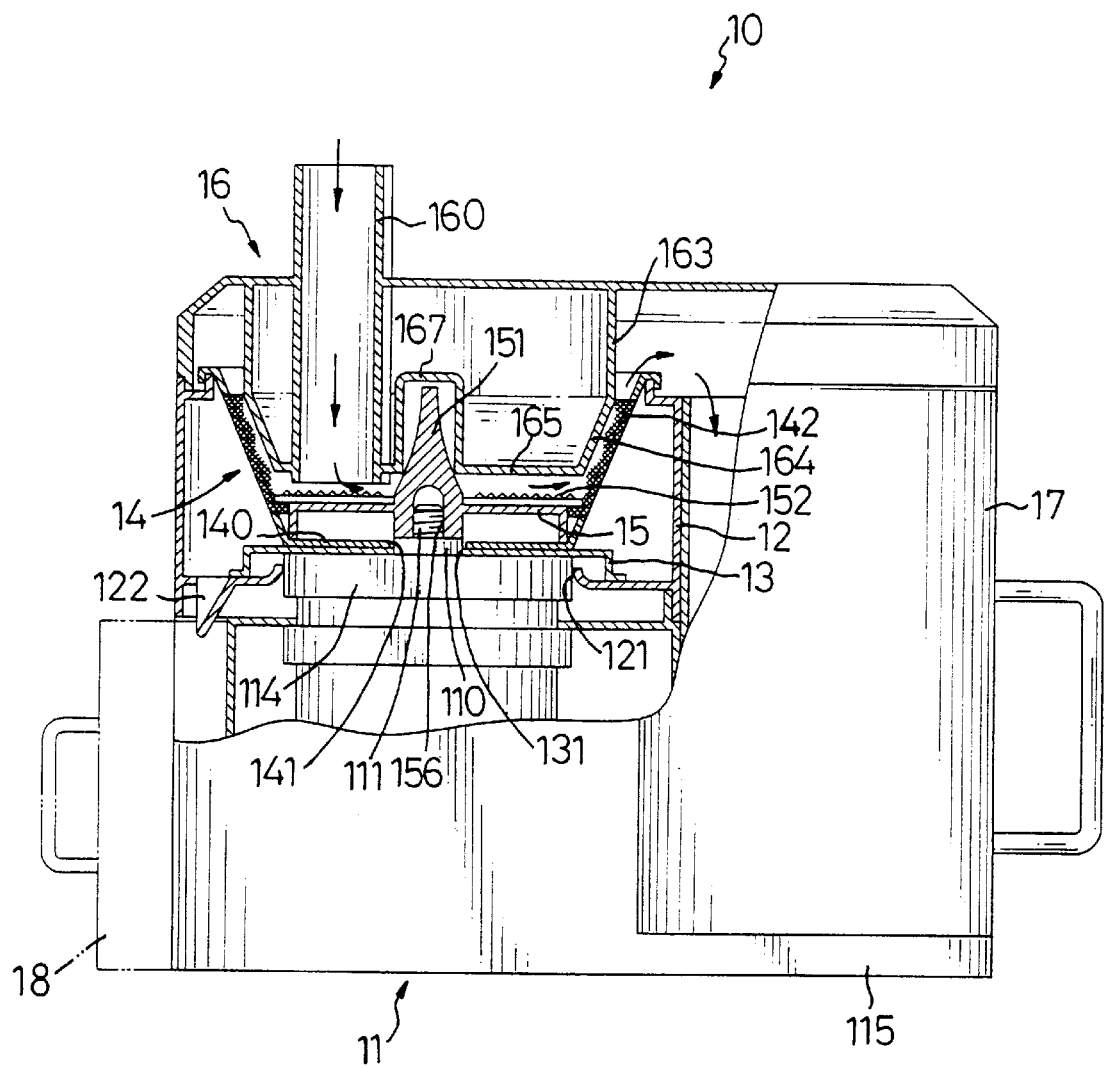
FIG. 3 is a front plan partially cross-sectional assembly view of the fruit and vegetable juice extractor as shown in FIG. 1.

Referring now to FIGS. 1–3, a cover (or lid) (16) in accordance with a first embodiment of the present invention can be adapted to be mounted to a fruit and vegetable juice extractor (10).

The fruit and vegetable juice extractor (10) comprises a motor base (11), a rotary disk (114) rotatably mounted on the top of the motor base (11), a motor (not shown) mounted in the motor base (11) for rotating the rotary disk (114), an oblong block (110) secured on the rotary disk (114) to rotate therewith, a threaded rod (111) secured on the oblong block (110) to rotate therewith, a housing (12) secured on the top of the motor base (11) and containing a socket (121) defined in the bottom thereof for receiving the rotary disk (114) therein, a juice spout (122) mounted on the periphery of the housing (12), a juice collector cup (18) attached to the motor base (11) and located under the juice spout (122), a cap (13) received in the housing (12) and secured on the rotary disk (114) to rotate therewith, a funnel-shaped strainer hood (14) rotatably mounted in the housing (12) and including a bottom wall (140) secured to the oblong block (110) to rotate therewith, and a tapered wall containing a plurality of meshes (142) formed therein, a cutter disk (15) rotatably mounted in the housing (12) and secured to the threaded rod (111) to rotate therewith, a plurality of cutter blades (152) mounted on the top of the cutter disk (15) in a radiating manner, and a dregs receiving container (17) attached to a platform (115) of the motor base (11) and connecting to the strainer hood (14).

The cap (13) contains a hole (131) defined in the center thereof receiving the oblong block (110) therein, and the bottom wall (140) of the strainer hood (14) contains an oblong hole (141) defined in the center thereof receiving the oblong block (110) therein.

The cutter disk (15) includes a central shaft (151) secured on the center thereof to rotate therewith and containing a threaded bore (156) threadedly receiving the threaded rod (111) therein, thereby securing the cutter disk (15) to the threaded rod (111). In such a manner, the cutter disk (15), the strainer hood (14) and the cap (13) are simultaneously rotated when the rotary disk (114) is rotated.

The cover (16) is mounted to the top of the housing (12) and comprises a feed tube (160) formed in the cover (16) and having a first end portion extending outward from the cover (16), and a second end portion extending inward from the cover (16) and located adjacent to the cutter blades (152) of the cutter disk (15), and a baffle device formed in the cover (16) and located adjacent to the cutter blades (152) of the cutter disk (15).

The baffle device includes an upright baffle (163) having a first end portion and a second end portion, the first end portion extending from the cover (16) toward the strainer hood (14), a tapered baffle (164) having a first end portion and a second end portion, the first end portion extending from the second end portion of the upright baffle (163), and arranged parallel with and located adjacent to the meshes (142) of the tapered wall of the strainer hood (14), and a bottom baffle (165) formed on the second end portion of the tapered baffle (164) and arranged parallel with and located adjacent to the cutter blades (152) of the cutter disk (15), wherein the second end portion of the feed tube (160) extends through the bottom baffle (165) of the baffle device.

In operation, the fruits and vegetables pushed into the feed tube (160) are cut into pieces by means of the cutter blades (152) of the rotating cutter disk (15), thereby extracting juices from the fruits and vegetables, which are then poured into the juice collector cup (18) through the juice spout (122). The residual dregs being left after the extracting process are then carried into the dregs receiving container (17) through the tapered wall of the strainer hood (14) by means of the centrifugal force exerted by the cutter blades (152) of the cutter disk (15) rotating at a high speed.

In such a manner, the tapered baffle (164) adjacent to the tapered wall of the strainer hood (14), and the bottom baffle (165) adjacent to the cutter blades (152) of the cutter disk (15) are used to limit the movement space of the residual dregs of the fruits and vegetables, thereby largely lengthening the contact time of the residual dregs with the cutter blades (152) of the cutter disk (15) and the meshes (142) of the strainer hood (14) so as to extract more juices from the residual dregs of the fruits and vegetables, thereby efficiently increasing the juice extracting and straining effect to the fruits and vegetables.

The central shaft (151) of the cutter disk (15) extends through the bottom baffle (165) of the baffle device, and the baffle device further includes an inverted U-shaped barrel (167) formed on the bottom baffle (65) for receiving the central shaft (151) therein, thereby preventing the residual dregs of the fruits and vegetables from entering the baffle device of the cover (16).

Figure 4:
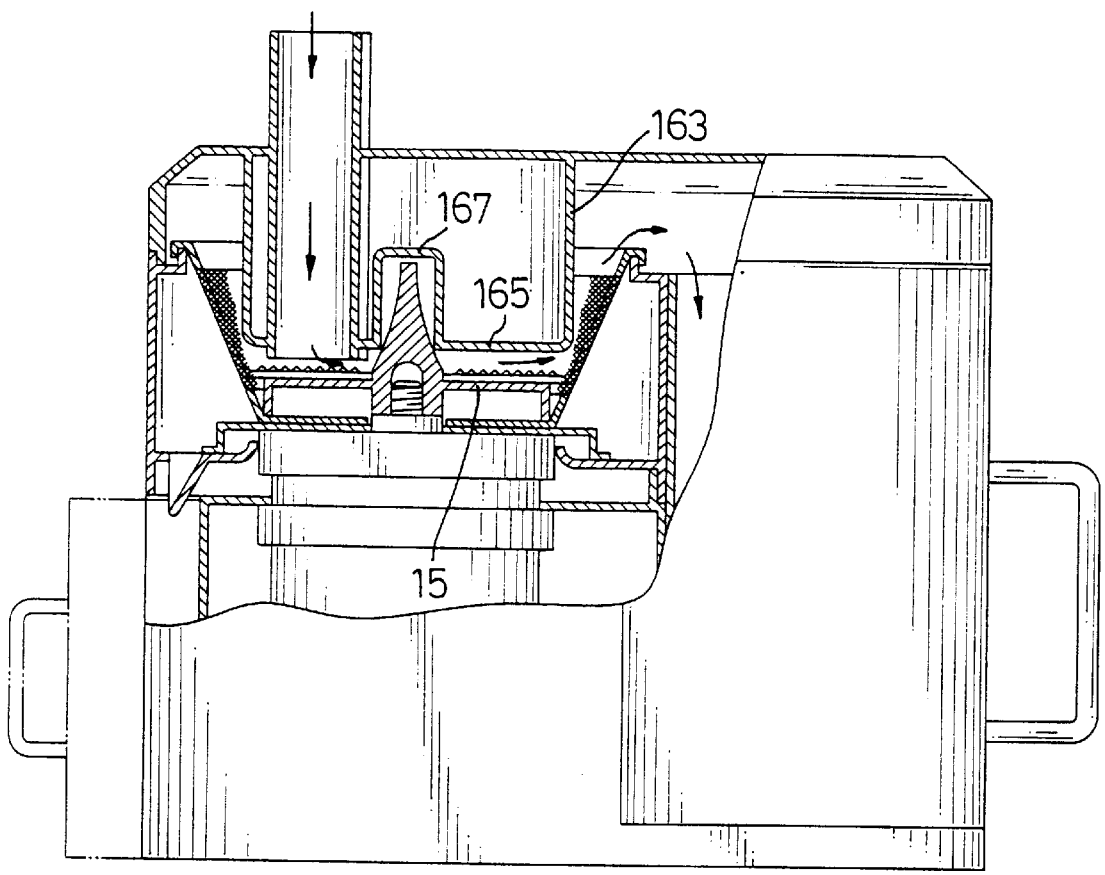
FIG. 4 is a front plan partially cross-sectional assembly view of the fruit and vegetable juice extractor in accordance with a second embodiment of the present invention.

Referring now to FIG. 4 with reference to FIGS. 1 and 3, in accordance with a second embodiment of the present invention, the tapered baffle (164) is removed, and the baffle device includes an upright baffle (163) having a first end portion extending from the cover (16) toward the strainer hood (14), and a second end portion located adjacent to the tapered wall of the strainer hood (14), and a bottom baffle (165) formed on the second end portion of the upright baffle (163) and arranged parallel with and located adjacent to the cutter blades (152) of the cutter disk (15).

Figure 5:
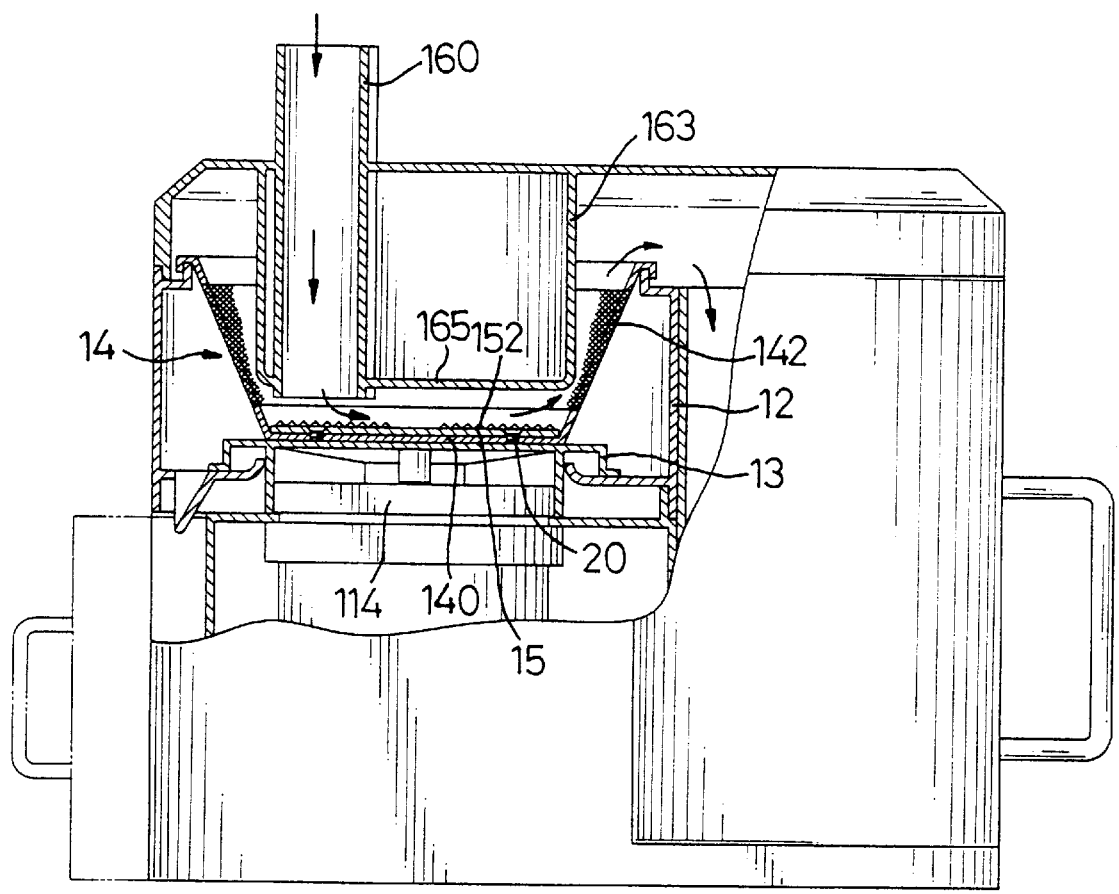
FIG. 5 is a front plan partially cross-sectional assembly view of the fruit and vegetable juice extractor in accordance with a third embodiment of the present invention.

Referring now to FIG. 5 with reference to FIG. 4, in accordance with a third embodiment of the present invention, the central shaft (151) of the cutter disk (15) is removed, and the cutter disk (15) is directly secured to the bottom wall (140) of the strainer hood (14) by means of a plurality of screws (20). The baffle device includes an upright baffle (163) having a first end extending from the cover (16) toward the strainer hood (14), and a second end portion located adjacent to the tapered wall of the strainer hood (14), and a bottom baffle (165) formed on the second end portion of the upright baffle (163) and arranged parallel with and located adjacent to the cutter blades (152) of the cutter disk (15).

Figure 6:
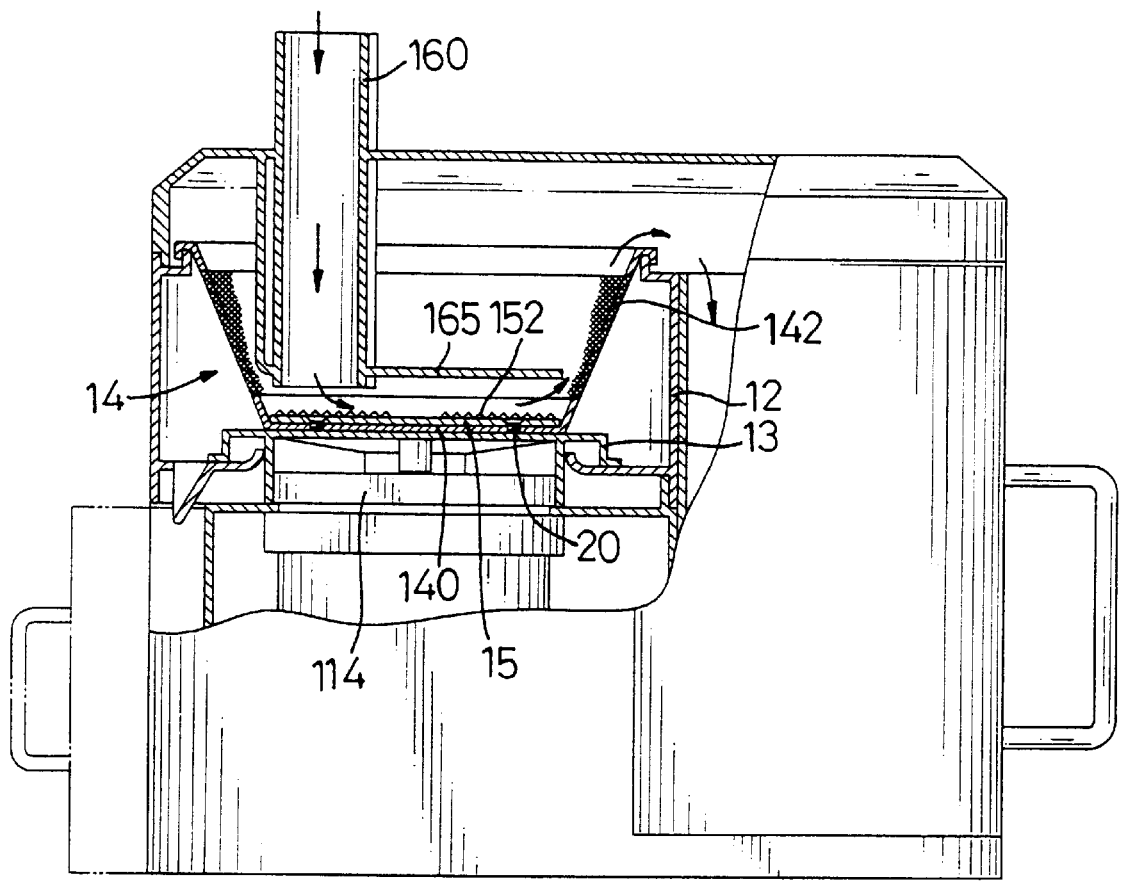
FIG. 6 is a front plan partially cross-sectional assembly view of the fruit and vegetable juice extractor in accordance with a fourth embodiment of the present invention.

Referring now to FIG. 6 with reference to FIG. 5, in accordance with a fourth embodiment of the present invention, the baffle device includes a bottom baffle (165) arranged parallel with and located adjacent to the cutter disk (15), and having a first end portion extending from the second end portion of the feed tube (160) and a second end portion located adjacent to the tapered wall of the strainer hood (14).

Figure 7:
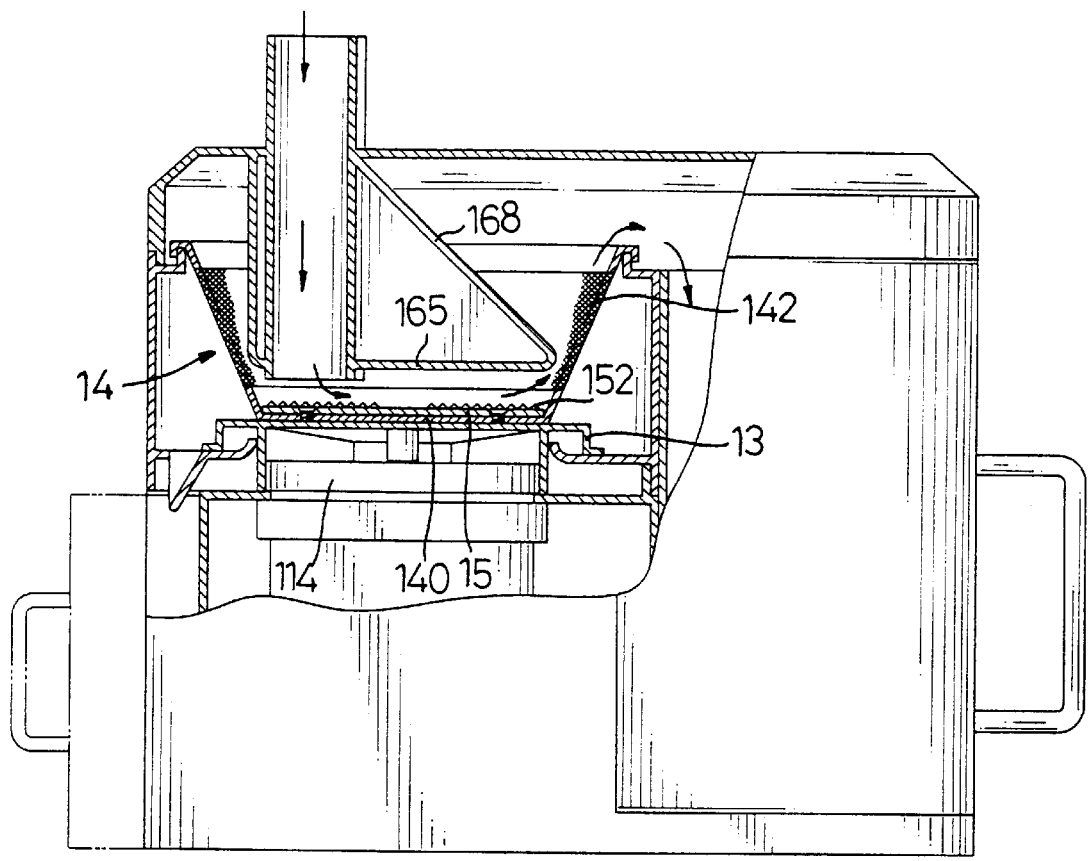
FIG. 7 is a front plan partially cross-sectional assembly view of the fruit and vegetable juice extractor in accordance with a fifth embodiment of the present invention.

Referring now to FIG. 7 with reference to FIG. 6, in accordance with a fifth embodiment of the present invention, the baffle device includes an inclined baffle (168) having a first end portion extending from the second end portion of the bottom baffle (165), and a second end portion extending from the first end portion of the feed tube (160).

Figure 8:
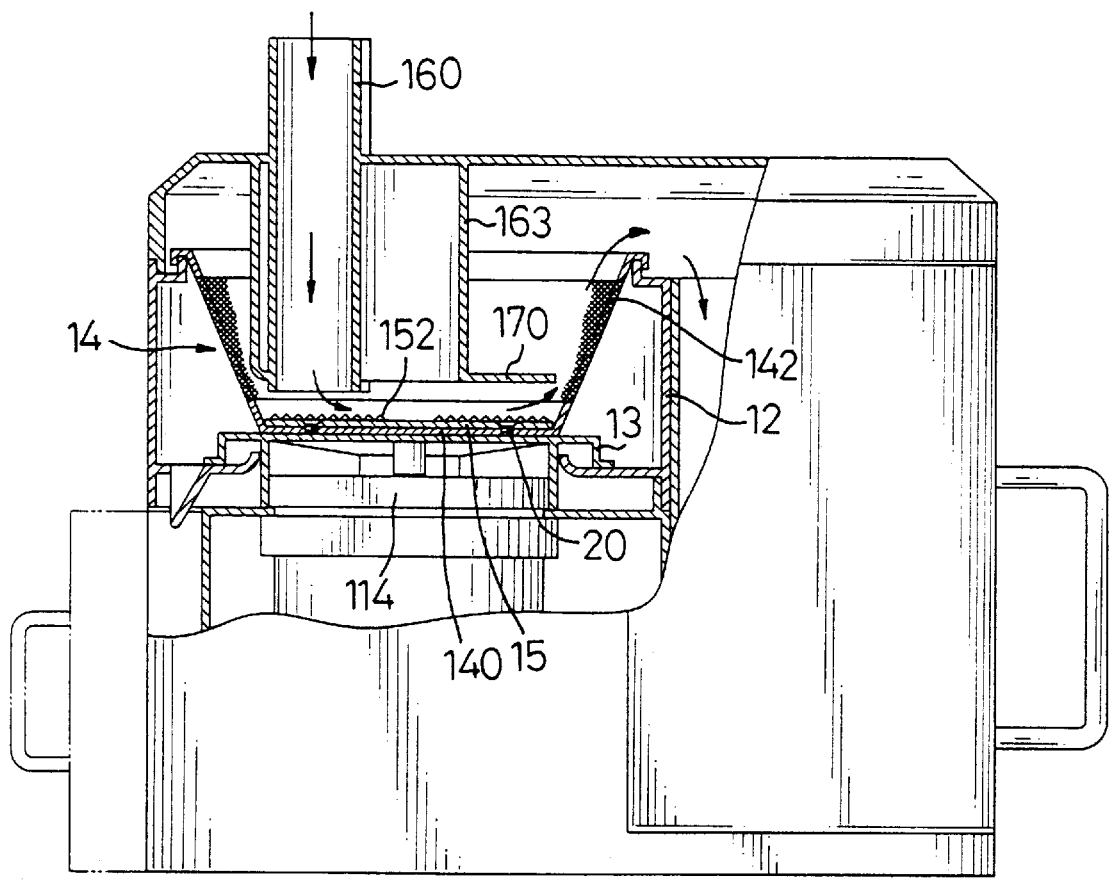
FIG. 8 is a front plan partially cross-sectional assembly view of the fruit and vegetable juice extractor in accordance with a sixth embodiment of the present invention.
Figure 9:
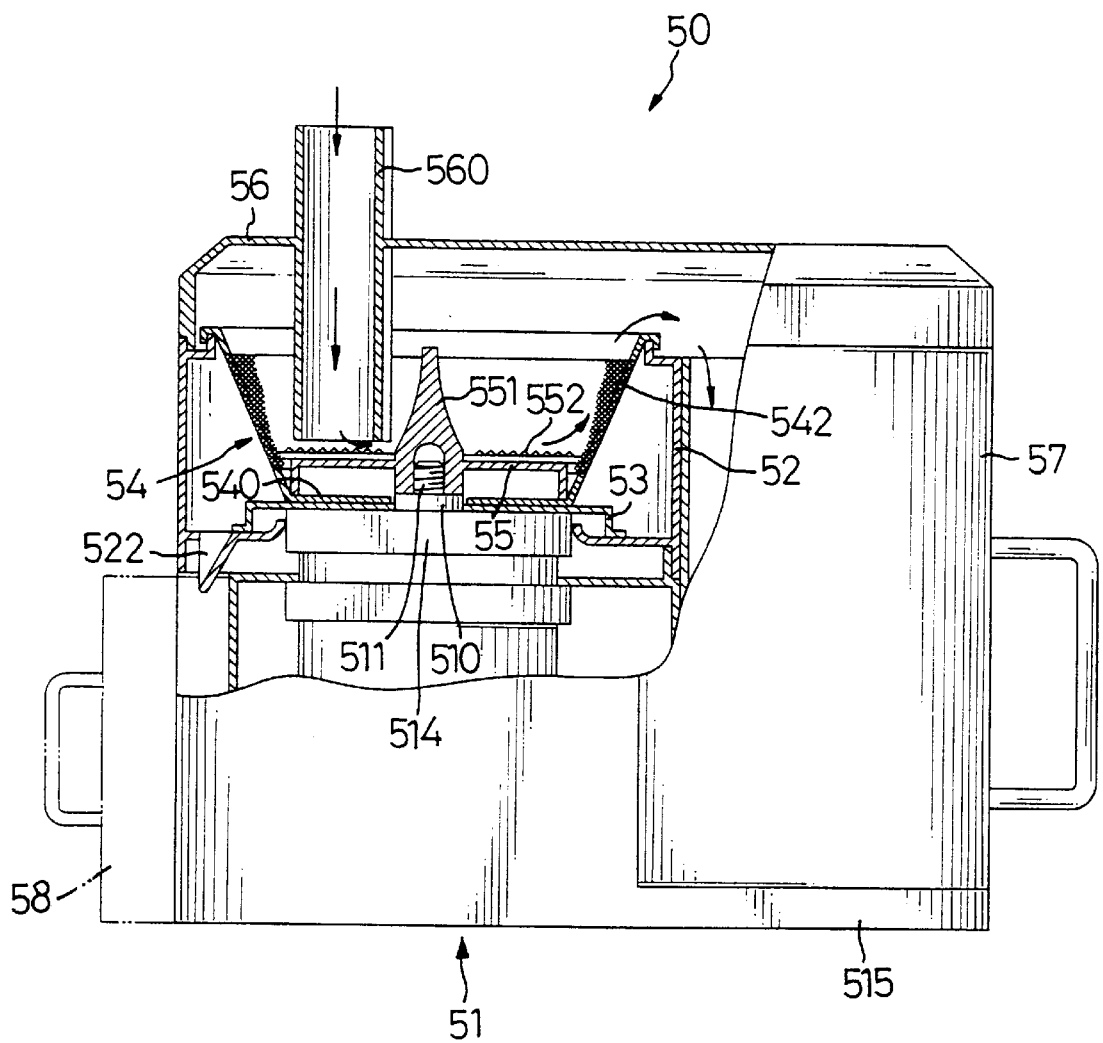
FIG. 9 is a front plan partially cross-sectional view of a conventional fruit and vegetable juice extractor in accordance with the prior art.

Referring now to FIG. 8 with reference to FIG. 5, in accordance with a sixth embodiment of the present invention, the baffle device includes an upright baffle (163) having a first end portion extending from the cover (16) toward the cutter disk (15), and a second end portion located adjacent to the cutter blades (152) of the cutter disk (15), and a bottom plate (170) arranged parallel with and located adjacent to the cutter blades (152) of the cutter disk (15), and having a first end portion extending from the second end portion of the upright baffle (163), and a second end portion located adjacent to the tapered wall of the strainer hood (14).

It should be clear to those skilled in the art that further embodiments may be made without departing from the scope and spirit of the present invention.

What is claimed is:

1. A cover (10) in combination with a fruit and vegetable juice extractor (10), said fruit and vegetable juice extractor (10) comprising: a motor base (11), a rotary disk (114) rotatably mounted on the top of said motor base (11), a housing (12) secured on the top of said motor base (11) and containing a socket (121) defined in the bottom thereof for receiving said rotary disk (114) therein, a funnel-shaped strainer hood (14) rotatably mounted in said housing (12) and including a bottom wall (140) secured to said rotary disk (114) to rotate therewith, and a tapered wall containing a plurality of meshes (142) formed therein, and a cutter disk (15) rotatably mounted in said housing (12) and secured to said bottom wall (140) of said strainer hood (14) to rotate therewith, said cover (16) mounted to the top of said housing (12) and comprising: a feed tube (160) formed in said cover (16) and having a first end portion extending outward from said cover (16), and a second end portion extending inward from said cover (16) and located adjacent to said cutter disk (15); and a baffle device formed in said cover (16) and located adjacent to said cutter disk (15).

2. The cover in accordance with claim 1, wherein said baffle device further includes an upright baffle (163) having a first end portion and a second end portion, said first end portion extending from said cover (16) toward said strainer hood (14), a tapered baffle (164) having a first end portion and a second end portion, said first end portion extending from said second end portion of said upright baffle (163) and located adjacent to said meshes (142) of said tapered wall of said strainer hood (14), and a bottom baffle (165) formed on said second end portion of said tapered baffle (164) and arranged parallel with and located adjacent to said cutter disk (15).

3. The cover in accordance with claim 2, wherein said second end portion of said feed tube (160) extends through said bottom baffle (165) of said baffle device.

4. The cover in accordance with claim 2, wherein said cutter disk (15) includes a central shaft (151) secured on said cutter disk (15) to rotate therewith and extending through said bottom baffle (165) of said baffle device, and said baffle device further includes an inverted U-shaped barrel (167) formed on said bottom baffle (65) for receiving said central shaft (151) therein.

5. The cover in accordance with claim 1, wherein said baffle device further includes an upright baffle (163) having a first end portion and a second end portion, said first end portion extending from said cover (16) toward said strainer hood (14), and a bottom baffle (165) formed on said second end portion of said upright baffle (163) and arranged parallel with and located adjacent to said cutter disk (15).

6. The cover in accordance with claim 5, wherein said second end portion of said feed tube (160) extends through said bottom baffle (165) of said baffle device.

7. The cover in accordance with claim 5, wherein said cutter disk (15) includes a central shaft (151) secured on said cutter disk (15) to rotate therewith and extending through said bottom baffle (165) of said baffle device, and said baffle device further includes an inverted U-shaped barrel (167) formed on said bottom baffle (65) for receiving said central shaft ( 151 ) therein.

8. The cover in accordance with claim 1, wherein said baffle device further includes a bottom baffle (165) arranged parallel with and located adjacent to said cutter disk (15), and having a first end portion extending from said second end portion of said feed tube (160), and a second end portion located adjacent to said tapered wall of said strainer hood (14).

9. The cover in accordance with claim 8, wherein said baffle device further includes an inclined baffle (168) having a first end portion extending from said second end portion of said bottom baffle (165), and a second end portion extending from said first end portion of said feed tube (160).

10. The cover in accordance with claim 1, wherein said baffle device further includes an upright baffle (163) having a first end portion extending from said cover (16) toward said cutter disk (15), and a second end portion located adjacent to said cutter disk (15), and a bottom plate (170) arranged parallel with and located adjacent to said cutter disk (15), and having a first end portion extending from said second end portion of said upright baffle (163) and a second end portion located adjacent to said tapered wall of said strainer hood (14).

* * * * *